(12) United States Patent
Gaus

(10) Patent No.: US 8,316,890 B2
(45) Date of Patent: Nov. 27, 2012

(54) PORT CLOSURE SYSTEM WITH HYDRAULIC HAMMER RESISTANCE

(75) Inventor: David J. Gaus, Saginaw, MI (US)

(73) Assignee: AptarGroup, Inc., Crystal Lake, IL (US)

( * ) Notice: Subject to any disclaimer, the term of this patent is extended or adjusted under 35 U.S.C. 154(b) by 902 days.

(21) Appl. No.: 12/268,814

(22) Filed: Nov. 11, 2008

(65) Prior Publication Data

US 2010/0116371 A1   May 13, 2010

(51) Int. Cl.
*F16K 15/14*   (2006.01)
(52) U.S. Cl. .................................... 137/859; 222/490
(58) Field of Classification Search ............ 137/859, 137/849, 847; 222/490, 494
See application file for complete search history.

(56) References Cited

U.S. PATENT DOCUMENTS

| | | | |
|---|---|---|---|
| 1,825,553 A | 9/1931 | Smith | |
| 4,133,457 A * | 1/1979 | Klassen | 222/212 |
| 4,749,108 A | 6/1988 | Dornsbusch et al. | |
| 4,991,745 A | 2/1991 | Brown | |
| 5,033,655 A | 7/1991 | Brown | |
| 5,115,950 A | 5/1992 | Rohr | |
| 5,213,236 A | 5/1993 | Brown et al. | |
| 5,271,531 A | 12/1993 | Rohr et al. | |
| 5,339,995 A | 8/1994 | Brown et al. | |
| 5,377,877 A | 1/1995 | Brown et al. | |
| 5,409,144 A | 4/1995 | Brown | |
| 5,439,143 A | 8/1995 | Brown et al. | |
| 5,531,363 A | 7/1996 | Gross | |
| 5,676,289 A | 10/1997 | Gross et al. | |
| 5,839,614 A | 11/1998 | Brown | |
| 5,904,275 A | 5/1999 | Suffa | |
| 6,062,435 A | 5/2000 | Hess, III | |
| 6,065,642 A * | 5/2000 | Brown | 222/92 |
| 6,112,951 A | 9/2000 | Mueller | |
| 6,112,952 A | 9/2000 | Hess et al. | |

(Continued)

FOREIGN PATENT DOCUMENTS

FR    996 998    12/1951

(Continued)

OTHER PUBLICATIONS

The "International Search Report and the Written Opinion of the International Searching Autority, or the Declaration" dated Oct. 14, 2009 for PCT/US2009/05751.
Pending U.S. Appl. No. 12/070,799.
Pending U.S. Appl. No. 11/728,614.

*Primary Examiner* — Kevin Lee
*Assistant Examiner* — Macade Brown
(74) *Attorney, Agent, or Firm* — Wood, Phillips, Katz, Clark & Mortimer

(57) ABSTRACT

A port closure system (20) including a port structure (22), and a valve (24). The port structure (22) includes a port (28) for establishing communication between an exterior environment (30) and interior volume (32) that can receive a fluent substance. The valve (24) includes a flexible, resilient, self-closing, slit-type valve head (36) with an orifice that is normally closed in an unconstrained condition. The port (28) has a laterally inwardly facing engaging surface (34) and the valve has a laterally outwardly facing peripheral surface (54) that is compressed laterally inwardly by engagement with the surface (34) to increase the resistance of the normally closed orifice to opening when the head (36) is subjected to a pressure differential.

19 Claims, 10 Drawing Sheets

U.S. PATENT DOCUMENTS

| | | |
|---|---|---|
| 6,273,296 B1 | 8/2001 | Brown |
| 6,405,901 B1 | 6/2002 | Schantz et al. |
| 6,427,874 B2 | 8/2002 | Brown et al. |
| 6,530,504 B2 | 3/2003 | Socier |
| 6,616,016 B2 | 9/2003 | Hicks et al. |
| 6,951,295 B1 | 10/2005 | Gaus et al. |
| 6,971,558 B2 * | 12/2005 | Ramsey et al. ............... 222/492 |
| 2005/0087555 A1 | 4/2005 | Hatton et al. |
| 2008/0035677 A1 | 2/2008 | Daansen |
| 2008/0237278 A1 * | 10/2008 | Gaus et al. ............... 222/630 |

FOREIGN PATENT DOCUMENTS

| | | |
|---|---|---|
| JP | 50-32516 | 3/1975 |
| JP | 2-73151 | 2/1990 |
| WO | WO 98/14386 | 4/1998 |
| WO | WO 99/10247 | 3/1999 |

* cited by examiner

PORT CLOSURE SYSTEM WITH HYDRAULIC HAMMER RESISTANCE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates generally to a system for accommodating the flow of a fluent substance. The invention more particularly relates to a port closure system having a flexile, resilient valve and accommodating the flow of the fluent substance through the valve.

BACKGROUND OF THE INVENTION

The inventor of the present invention has discovered that it would be advantageous to provide an improved system for retaining or otherwise mounting a flexible, resilient valve defining an initially closed orifice which can be opened to accommodate fluid flow through the valve, wherein the design of the system could provide advantages not heretofore contemplated in the industry or suggested by the prior art. In particular, the system of the present invention facilitates proper closing of the valve after portions of the valve have been forced away from their initially closed configuration and is resistant to hydraulic hammer caused by a fluent substance acting against the valve.

One type of flexible, resilient, valve is a self-closing, slit-type valve mounted in a port of a fluent container. Such valves have a slit or slits which define a normally closed orifice that opens to permit flow therethrough in response to either a probe or fill/drain tool inserted through the valve, or an increased pressure differential across the valve (e.g., resulting from an increased pressure within the container when the container is squeezed, or from a reduced external ambient pressure compared to the pressure within the container). Such valves are typically designed so that they automatically close to shut off flow therethrough upon removal of the probe or fill/drain tool or a reduction of the increased internal pressure within the container, or upon an increase of the external pressure.

Designs of such valves and of closures using such valves are illustrated in the U.S. Pat. Nos. 5,271,531, 5,927,566, and 5,934,512. Typically, the closure includes a body or base mounted on the container neck to define a seat for receiving the valve and includes a retaining ring or other structure for holding the valve on the seat in the base. See, for example, U.S. Pat. Nos. 6,269,986 and 6,616,016. The valve is normally closed and can withstand the weight of the fluid product when the bottle is completely inverted so that the liquid will not leak out unless the bottle is squeezed. With such an improved system, the lid or cap need not be re-closed (although it is typically re-closed if the package is to be transported to another location, packed in a suitcase, etc.). Another such valve system for use with a probe or fill/drain tool is shown in commonly owned U.S. patent application Ser. No. 12/070,799 titled VALVE MOUNTING ASSEMBLY WITH SLIT MISALIGNMENT PREVENTION FEATURE, filed Feb. 21, 2008 and naming David J. Gaus as inventor, the entire disclosure of which is incorporated herein by reference.

While such valved systems have significant advantages and function well, it would be desirable to provide an improved system that would better accommodate more rugged handling or abuse with a reduced risk of leaking. Specifically, when one of the above-described type of valved containers are dropped, knocked over or otherwise impacted, the fluid in the container may impact the valve with such force that the valve may momentarily open, and a small amount of liquid may be discharged. Such accelerated, transient, hydraulic pressure effects are sometimes described as a hydraulic hammer or water hammer.

It would be beneficial to provide an improved valve port closure system which eliminates or greatly minimizes the tendency of the valve to open when the fluent container is subjected to hydraulic hammer such as when the container is tipped over, dropped, or otherwise subjected to a sudden impact such as when the user sets the container down on a surface with force and impact.

One approach to provide a valve with hydraulic hammer resistance is shown in commonly owned U.S. patent application Ser. No. 11/728,614 titled "DISPENSING VALVE WITH HYDRAULIC HAMMER RESISTANCE" and filed on Mar. 27, 2007 naming David J. Gaus et al as inventors, the entire disclosure of which is incorporated herein by reference. While the valve shown in the Ser. No. 11/728,614 works well for its intended purpose, there is always room for other approaches and improvements.

SUMMARY OF THE INVENTION

The inventor of the present invention has invented an innovative port closure system for a fluent container which, inter alia, can provide an improved resistance to hydraulic hammer.

In accordance with one aspect of the invention, a port closure system hydraulic hammer resistance, and includes (1) a port to establish communication between an interior volume that can receive a fluent substance and an exterior environment, and (2) a valve including a flexible, resilient head extending across the port. The valve head has (a) an interior side facing the interior volume, (b) an exterior side facing the exterior environment, (c) at least one self-sealing slit through the head, and (d) confronting, openable portions along the slit to define a normally closed orifice in an unconstrained condition wherein the openable portions can move in a first direction toward the interior volume to an open orifice configuration and in a second direction toward the exterior environment to another open orifice configuration. The port has a laterally inwardly facing engaging surface; and the valve further includes a laterally outwardly facing peripheral surface compressed laterally inwardly by engagement with the engaging surface to thereby impose a closing force on said self-sealing slit to increase the resistance of the normally closed orifice to opening in at least the second direction when the valve head is subjected to a pressure differential acting across the valve head.

In one aspect, the interior side of the head is defined by a convex surface. As a further aspect, the convex surface is arcuate.

According to one aspect, the exterior side is defined by a concave surface. In a further aspect, the concave surface is arcuate, and in yet a further aspect the concave surface is semispherical.

As one aspect, the at least one self-sealing slit includes two self-sealing slits extending transverse to each other. In a further aspect, one of the two slits is more than 50% longer than the other of the two slits.

According to one aspect, the engaging surface is a cylindrical surface with a diameter D and the laterally outwardly facing peripheral surface is a frusto-conical surface in the unconstrained condition. In a further aspect, the frusto-conical surface has a maximum diameter adjacent the interior side that in the unconstrained condition is greater than the diameter D. In yet a further aspect, the valve further includes a peripheral attachment portion and the frusto-conical surface converges from the maximum diameter to a minimum diameter adjacent the peripheral attachment portion.

As one aspect, the valve is initially separate from, but subsequently engaged with the engaging surface. In a further aspect, the system further includes a seat around the port and the valve further includes a peripheral attachment portion engaged in said seat. In yet a further aspect, the seat is located outside of the interior volume. In one aspect, the system further includes a retainer ring in snap-fit engagement with the seat to clamp the peripheral attachment portion between the retainer ring and the seat.

According to one aspect, the laterally outwardly facing peripheral surface extends from the exterior side to the peripheral attachment portion.

The port closure of the present invention is particularly suitable for mounting a valve in dispensing apparatus wherein relative movement between the valve and an inserted conduit or probe causes portions of the valve head to open to accept the probe so that the probe extends through the valve. In one particular use of the invention, such a probe is a fluid inlet conduit employed to fill a fluid container such as a cup or mug.

The port closure system of the present invention can be positioned relative to an associated container (or other structure containing a fluent substance) by various arrangements. In particular, the port closure system may be permanently or releasably attached to the container (or other structure containing a fluent substance). Furthermore, the valve of the port closure system of the invention can be provided in a form which is initially separate from, but subsequently attachable to or retained within, the port closure system of the invention.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

DETAILED DESCRIPTION OF THE PREFERRED EMBODIMENT

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

As discussed in detail hereinafter, the port closure system of the present invention can be used to mount a valve in a fluid handling system, including in an associated container or other dispensing structure so as to accommodate transfer of fluent substances including, but not limited to, water, beer, or other fluids suitable for consumption.

Notably, the present invention port closure system is especially suitable for use with the type of flexible, resilient valve that includes a peripheral attachment portion of the valve and a central valve head (which is often openable in either of two opposite directions).

For ease of description, many of the figures illustrating the invention show one form of a valve held in one embodiment of the present invention port closure system in one typical orientation that the port closure system may have in a particular application, and terms such as upper, lower, horizontal, etc., are used with reference to this orientation. It will be understood, however, that the port closure system of this invention may be manufactured, stored, transported, sold, and used in an orientation other than the orientation described.

The port closure system of the present invention may be used with a variety of conventional or special fluent substance handling and/or holding systems, including glass or plastic bottles, flexible tubular containment structures, containers, tanks, vessels, and other equipment or apparatus, the details of which, although not fully illustrated or described, would be apparent to those having skill in the art and an understanding of such systems. The particular fluent substance handling or holding system, per se, forms no part of, and therefore is not intended to limit, the broad aspects of the present invention. It will also be understood by those of ordinary skill that novel and non-obvious inventive aspects are embodied in the described exemplary valve mounting system alone.

Figure 1:
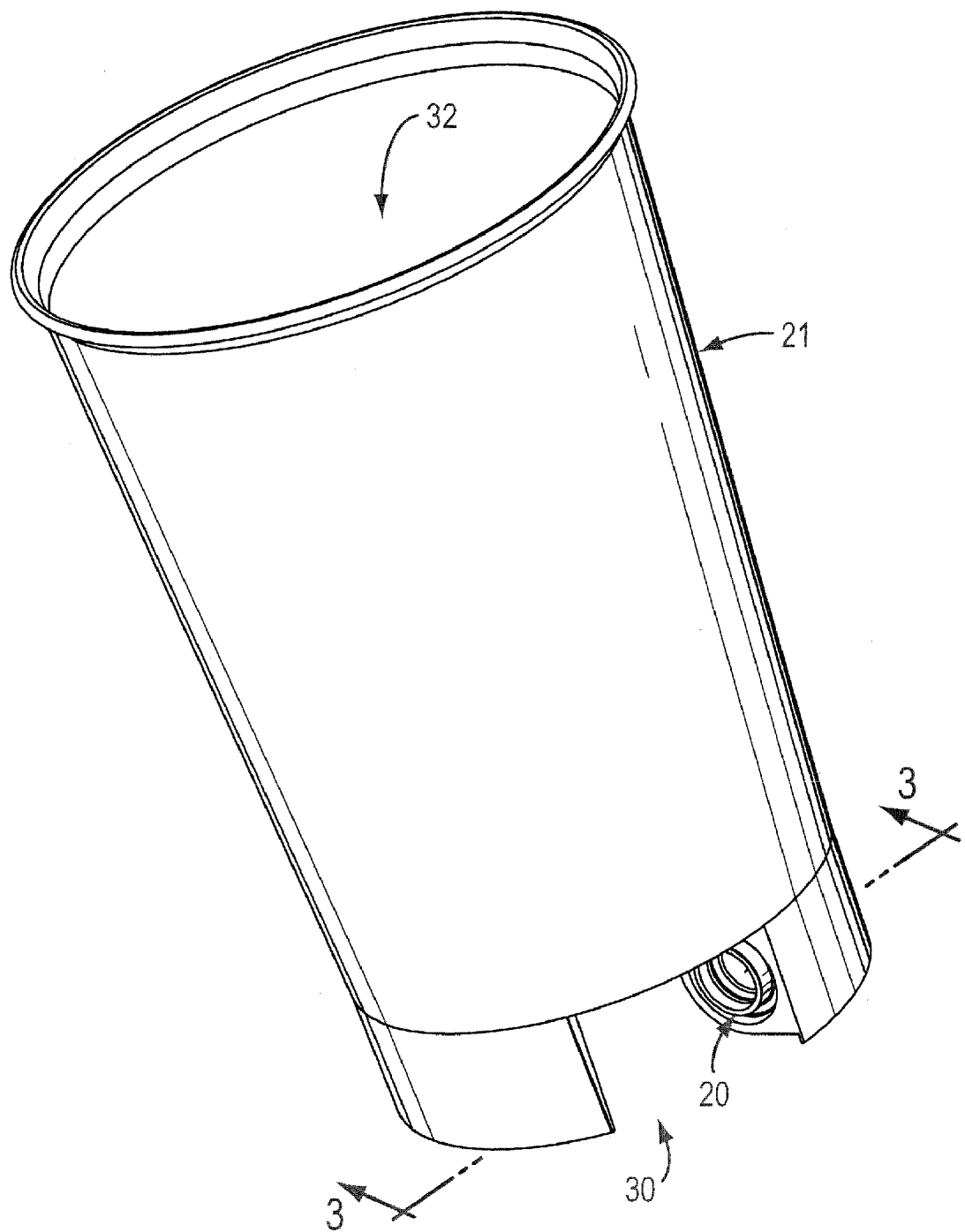
FIG. 1 is an isometric view from above of a fluid container in the form of a cup that incorporates a port closure system embodying the present invention, with a flexible, resilient valve of the closure system shown in a closed position.
Figure 2:
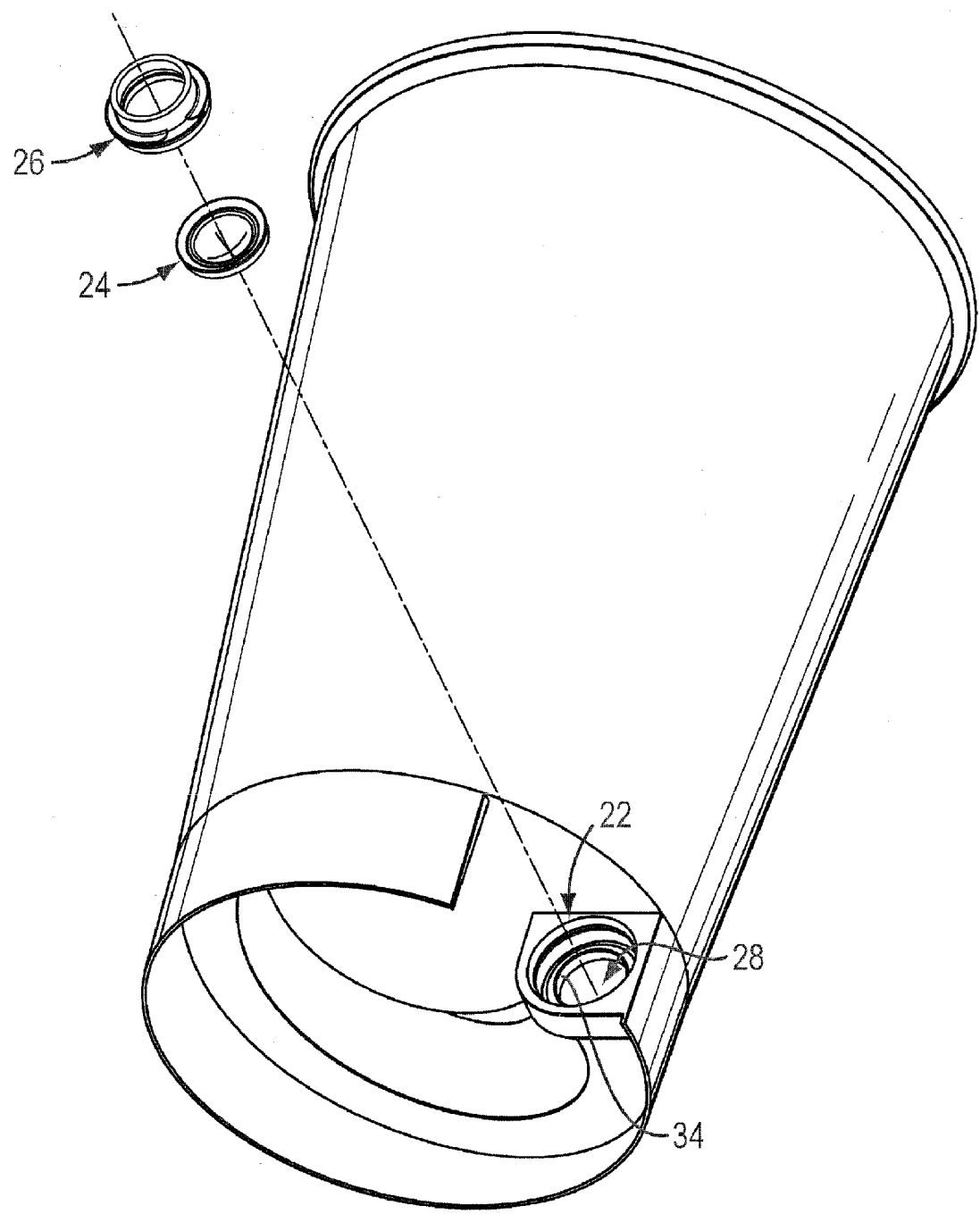
FIG. 2 is an isometric, exploded view of the cup and port closure system of FIG. 1 showing the valve in an as-molded condition wherein the valve is unconstrained and also showing a retainer component of the system removed from a port structure of the system.
Figure 3:
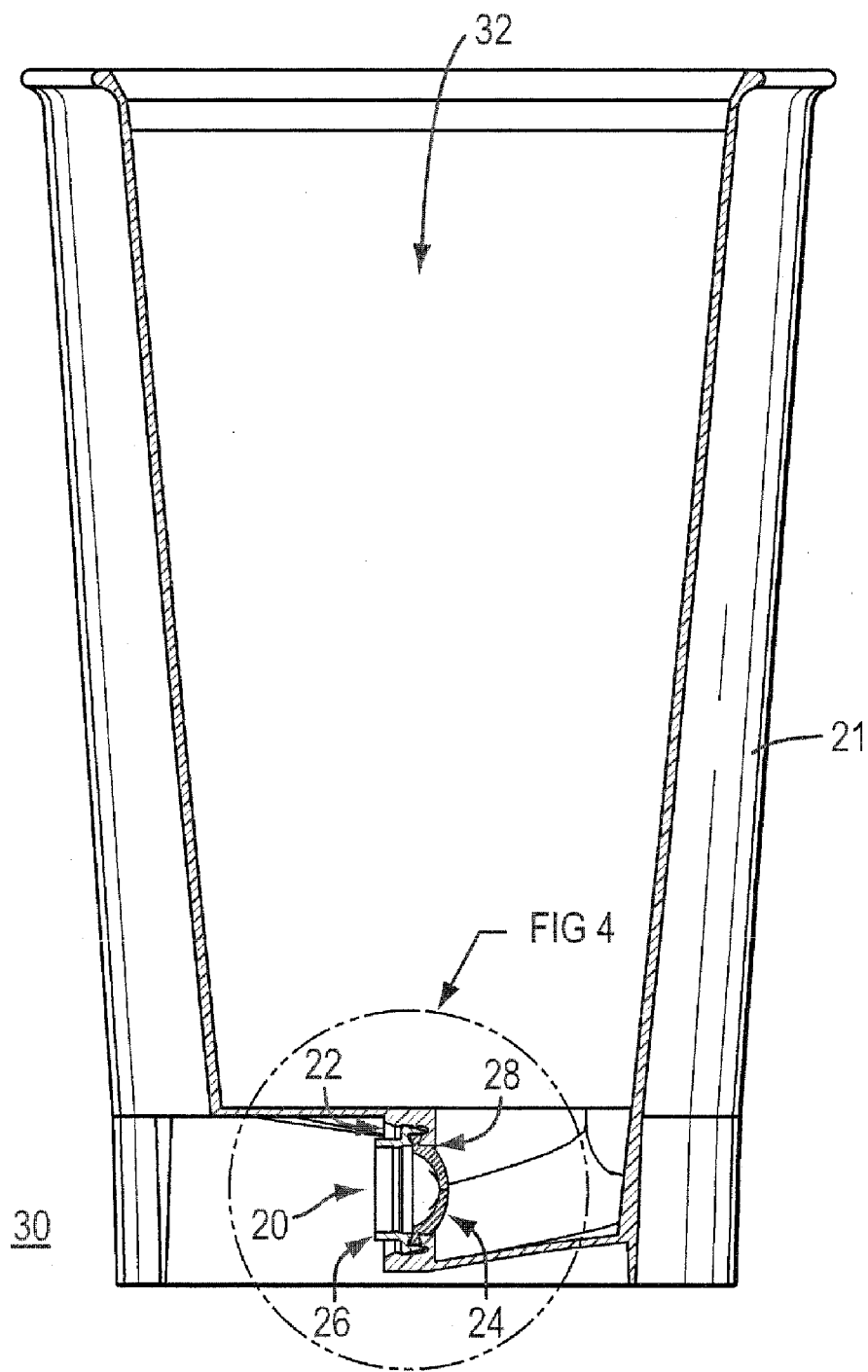
FIG. 3 is a section view taken from line 3-3 in FIG. 1.
Figure 4:
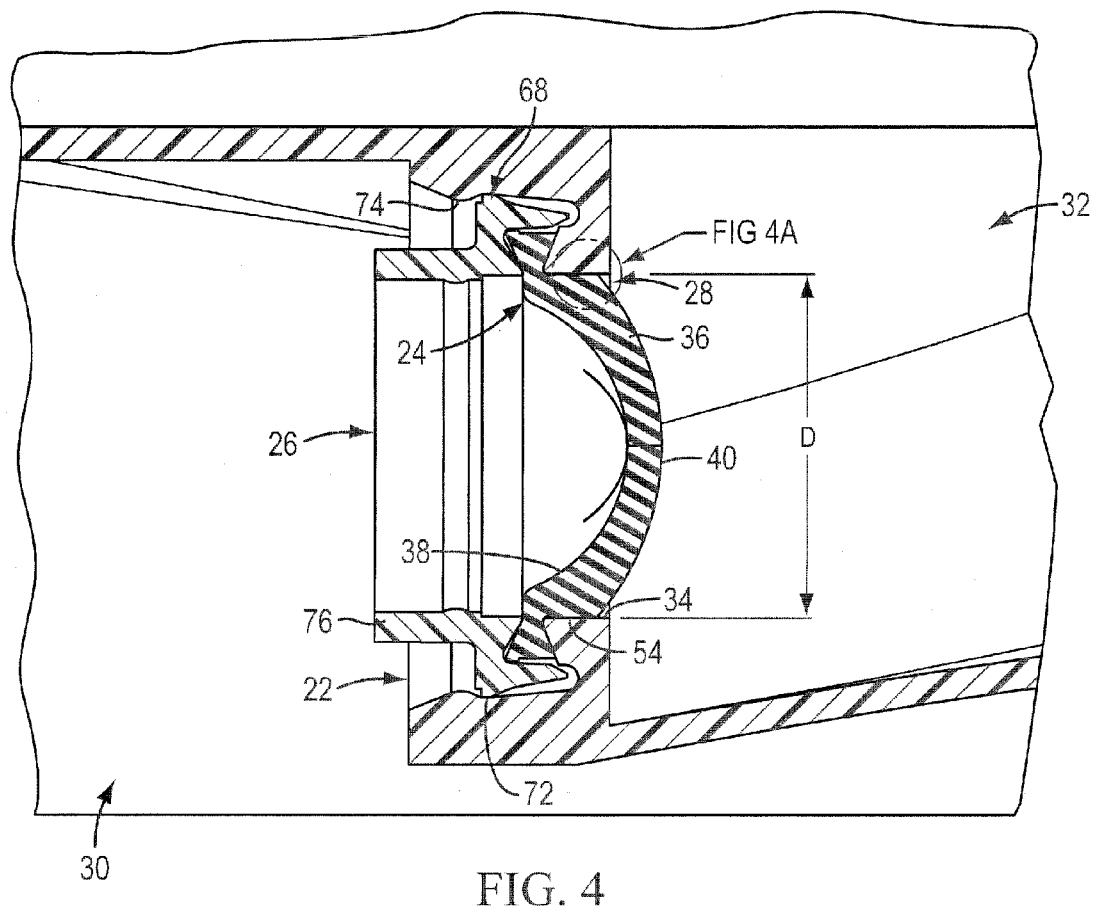
FIG. 4 is an enlarged view of the encircled portion of FIG. 3.

A presently preferred embodiment of the port closure system is illustrated in FIGS. 1-6 and is designated generally by the number 20. The system 20 is illustrated in connection with a fluent container in the form of a beverage cup 21. As best seen in FIGS. 2 and 3, the system 20 includes a port structure 22, a valve 24, and a mounting fitment or retainer 26. The port structure 22 includes a port 28 for establishing communication between an exterior environment 30 and interior volume 32 that can receive a fluent substance such as a beverage. As best seen in FIG. 4, the port 28 has a laterally inwardly facing engaging surface 34 that is preferably cylindrical with a diameter D.

The valve 24 is a self-closing, slit-type valve and can be seen in greater detail in FIGS. 7-14. The valve 24 is preferably molded as a unitary structure from material which is flexible, pliable, elastic, and resilient. This can include elastomers, such as a synthetic, thermosetting polymer, including silicone rubber, such as the silicone rubber sold by Dow Corning Corp. in the United States of America under the trade designation SILASTIC 99-595-HC. Another suitable silicone rubber material is sold in the United States of America under the designation Wacker 3003-40 by Wacker Silicone Company. Both of these materials have a hardness rating of 40 Shore A. The valve 24 could also be molded from other thermosetting materials or from other elastomeric materials, or from thermoplastic polymers or thermoplastic elastomers, including those based upon materials such as thermoplastic propylene, ethylene, urethane, and styrene, including their halogenated counterparts.

The valve 24 has a normally closed, rest position or configuration shown in FIGS. 1, 3 and 4. The valve 24 can be forced to one or more open positions or configurations, as shown in FIGS. 5, 6, 9 and 10 when a sufficiently high force acts on the valve 24 as described hereinafter. The valve 24 includes a flexible, central portion or head 36 (FIGS. 1, 2, and 4) that extends across the port 28, with a first or exterior side 38 and a second or interior side 40. When the valve 24 is closed, the interior side 40 has a surface that is convex and arcuate in shape, and the exterior side 38 has a surface that is concave and arcuate in shape and preferably semispherical. In this regard, while preferred forms of the head 36 are shown herein, it should be understood that other configurations, such as for example those shown in aforementioned U.S. patent application Ser. Nos. 11/728,614 and 12/070,799 may be desirable depending upon the specific parameters and requirements of each particular application.

Figure 12:
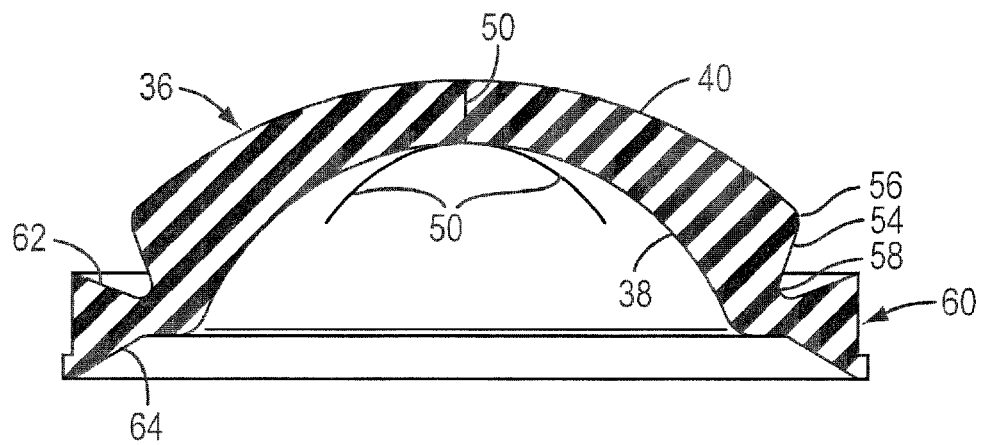
FIG. 12 is a section view taken along line 12-12 in FIG. 11.
Figure 13:
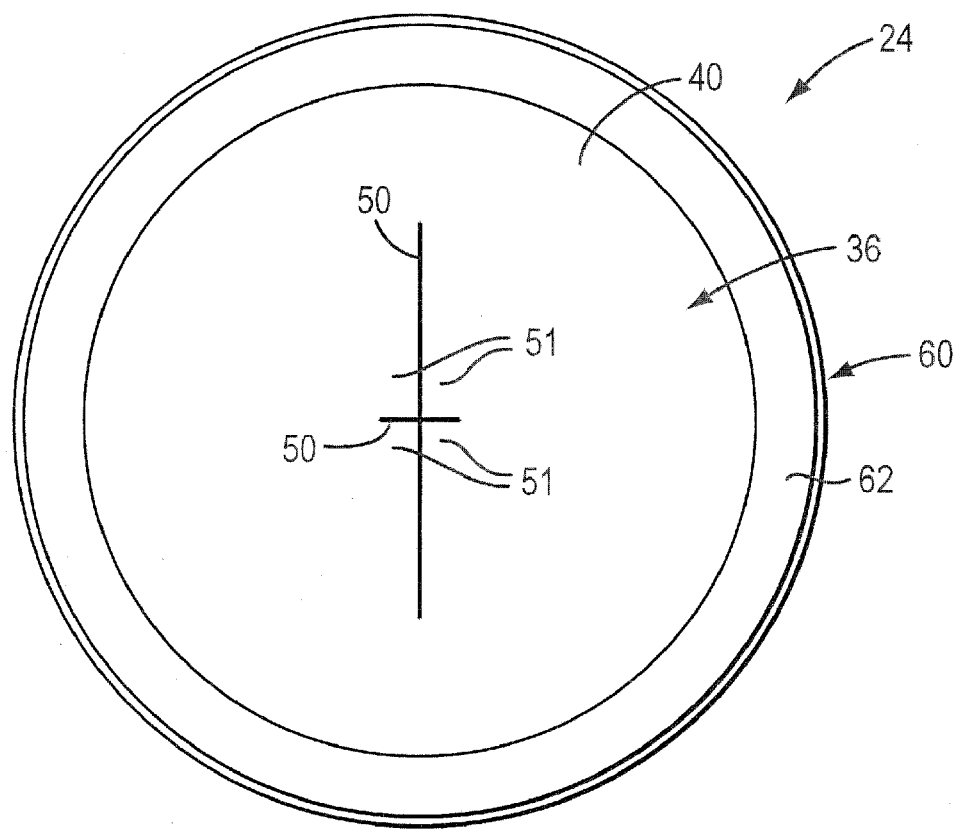
FIG. 13 is a plan view showing another embodiment of the valve of FIG. 1 in a closed state and as-molded, unconstrained condition.
Figure 14:
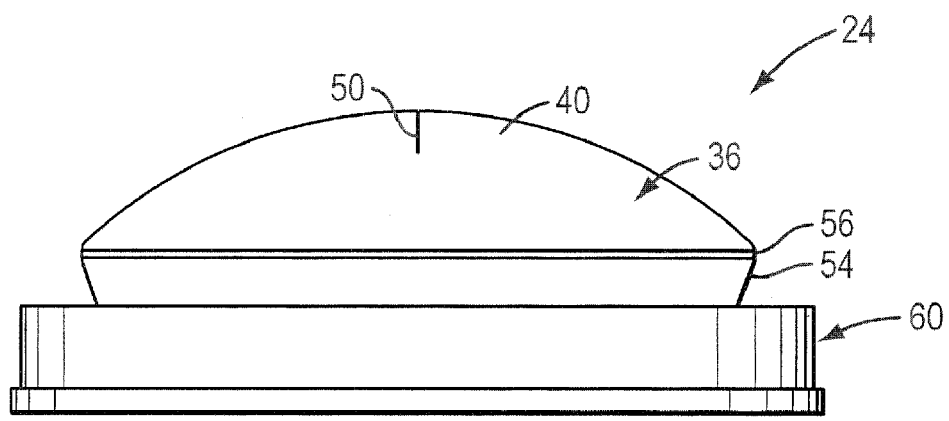
FIG. 14 is an elevation view of the valve of FIG. 13.

As best seen FIGS. 7, 8 and 11-14, the head 36 has planar, intersecting, self-sealing slits 50 which together define a closed orifice when the valve 24 is closed. For the embodiment shown in FIGS. 2-12, the slits 50 are normal to each other and equal in length. FIGS. 13 and 14 illustrate a preferred embodiment wherein the slits 50 are normal to each other, but one of the slits 50 is at least 50% longer than the other slit 50, and even more preferable in the range of 4 or 5 times longer than the other slit 50 In the illustrated forms of the valve 24, the slits 50 define four, generally sector-shaped, equally sized flaps or petals 51 in the head 36. The flaps or petals 51 may be also characterized as "openable regions" or "openable portions" of the valve head 36. Each flap or petal 51 has a pair of diverging transverse faces defined by the slits 50, and each transverse face seals against a confronting transverse face of an adjacent petal 51 when the valve 24 is closed.

The valve 24 can be molded with the slits 50. Alternatively, the valve slits 50 can be subsequently cut into the head 36 of the valve 24 by suitable conventional techniques. However the slits 50 are formed, the orifice should be closed when the valve 24 is in an unconstrained or as-molded condition. In operation, the petals 51 can be forced open outwardly in a first direction (toward the exterior environment 30 in FIGS. 1-4) from the intersection point of the slits 50 when a sufficient force (or pressure differential) is applied to the interior side 40 of the valve head 36, or forced open inwardly in a second direction (toward the interior volume 32 in FIGS. 1-4) from the intersection point of the slits 50 when a sufficient force (or pressure differential) is applied to the exterior side 38 of the head 36.

Figure 5:
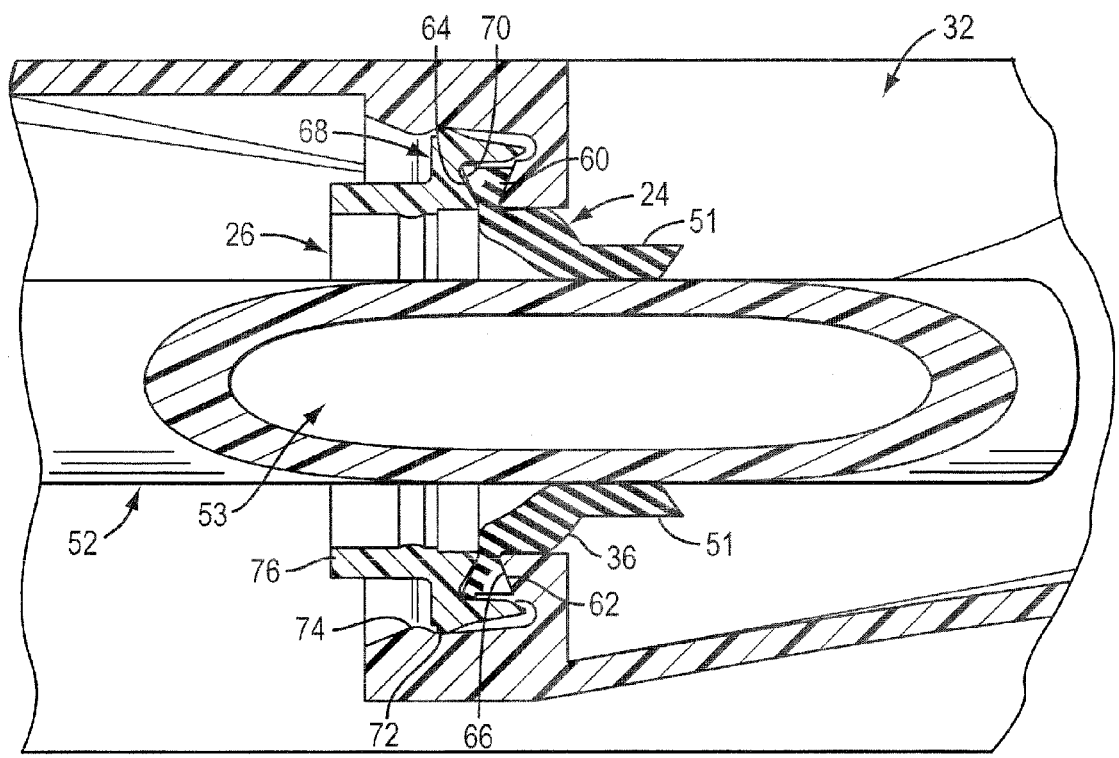
FIG. 5 is a view similar to FIG. 4 but showing the port closure system with the valve placed in an open condition by a fluent filling tool or probe that is inserted into the port closure system to provide fluid to the interior volume of the container.
Figure 6:
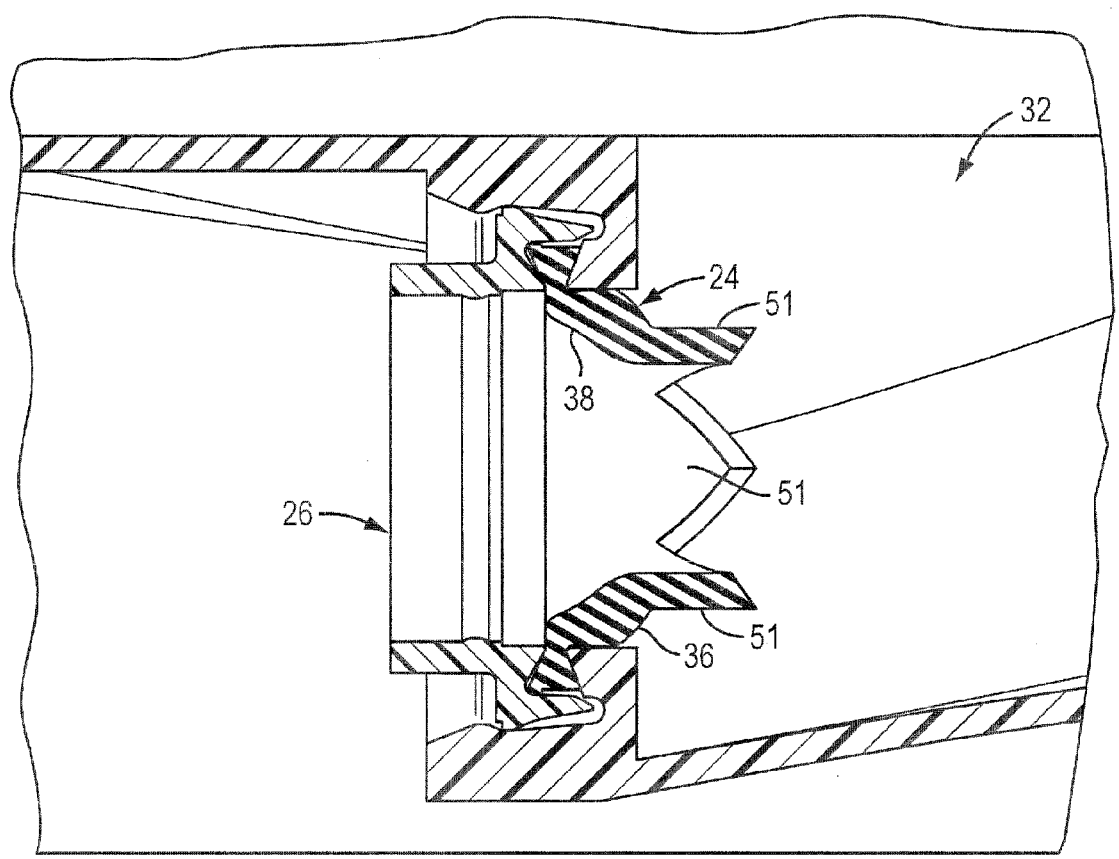
FIG. 6 is a view similar to FIG. 5, but with the fill tool not shown in order to more clearly illustrate the valve in the open condition.
Figure 7:
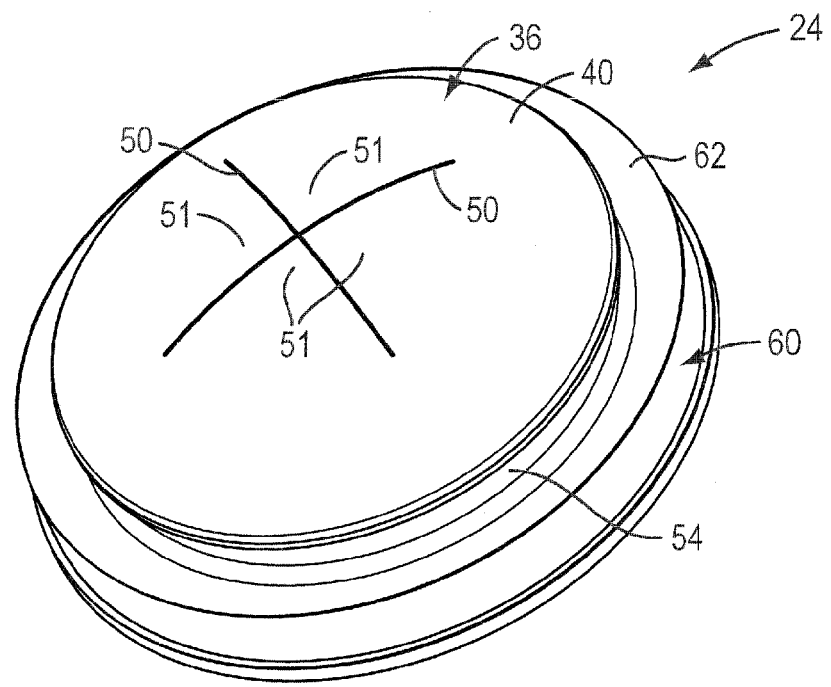
FIG. 7 is an enlarged isometric view of an embodiment of the valve of FIG. 1 showing an interior facing side of the valve in a closed state with the valve in an as-molded, unconstrained condition.
Figure 8:
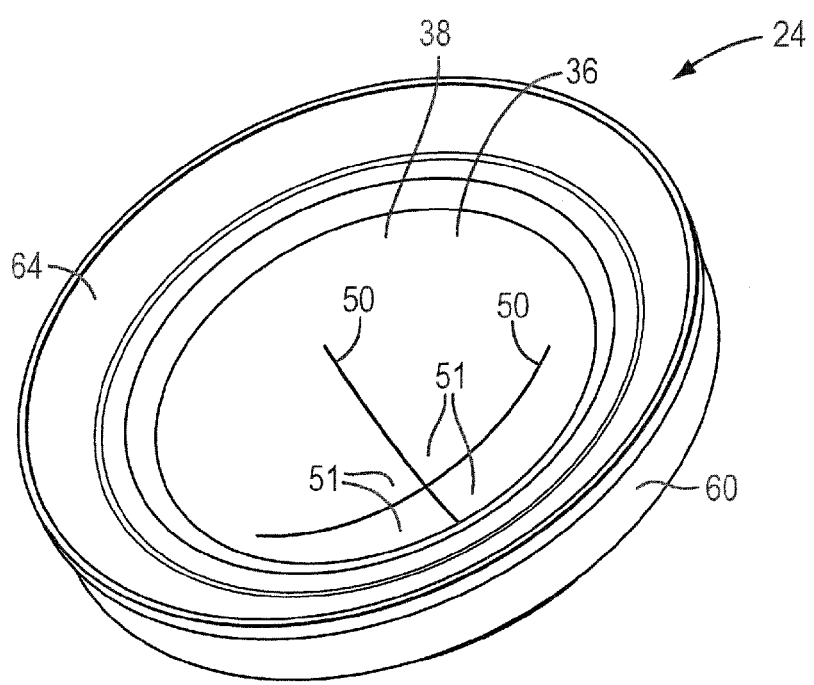
FIG. 8 is an enlarged isometric view of the valve of FIG. 7 showing an exterior facing side of the valve, again with the valve in the closed state in the unconstrained condition.
Figure 9:
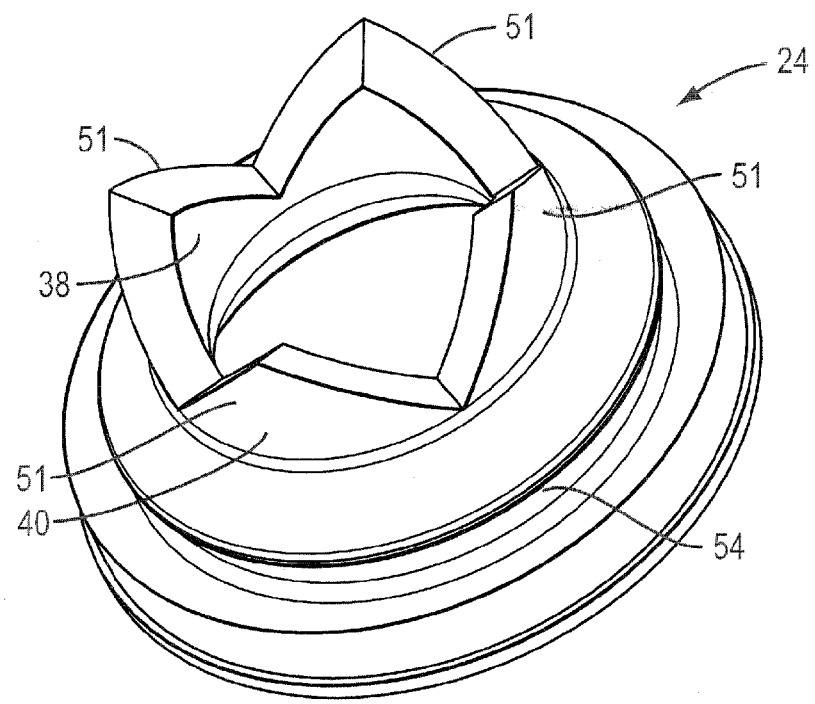
FIG. 9 is a view similar to FIG. 7, but showing the valve in an open state.
Figure 10:
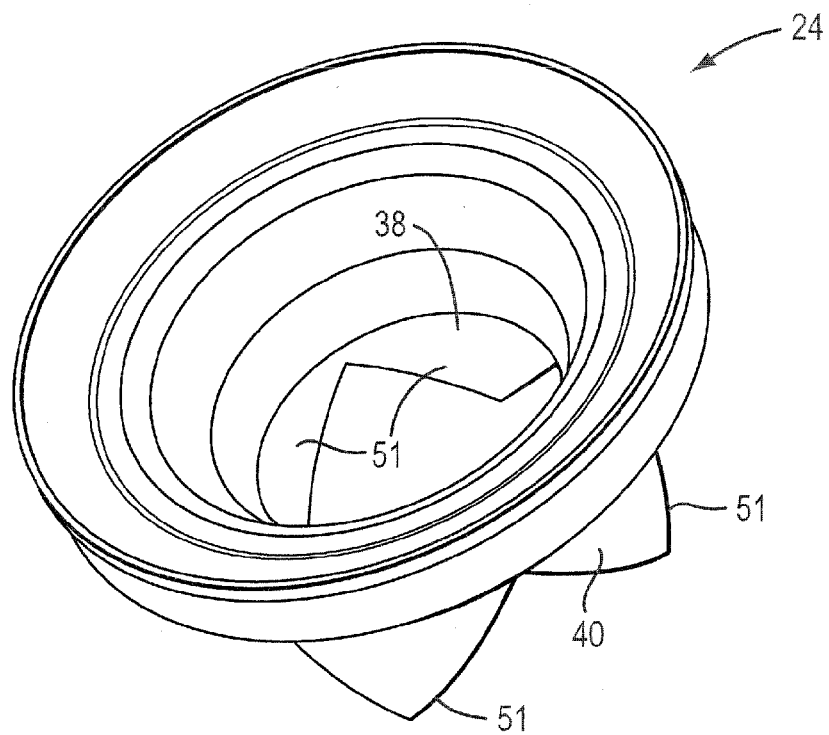
FIG. 10 is a view similar to FIG. 8, but again showing the valve in an open state.
Figure 11:
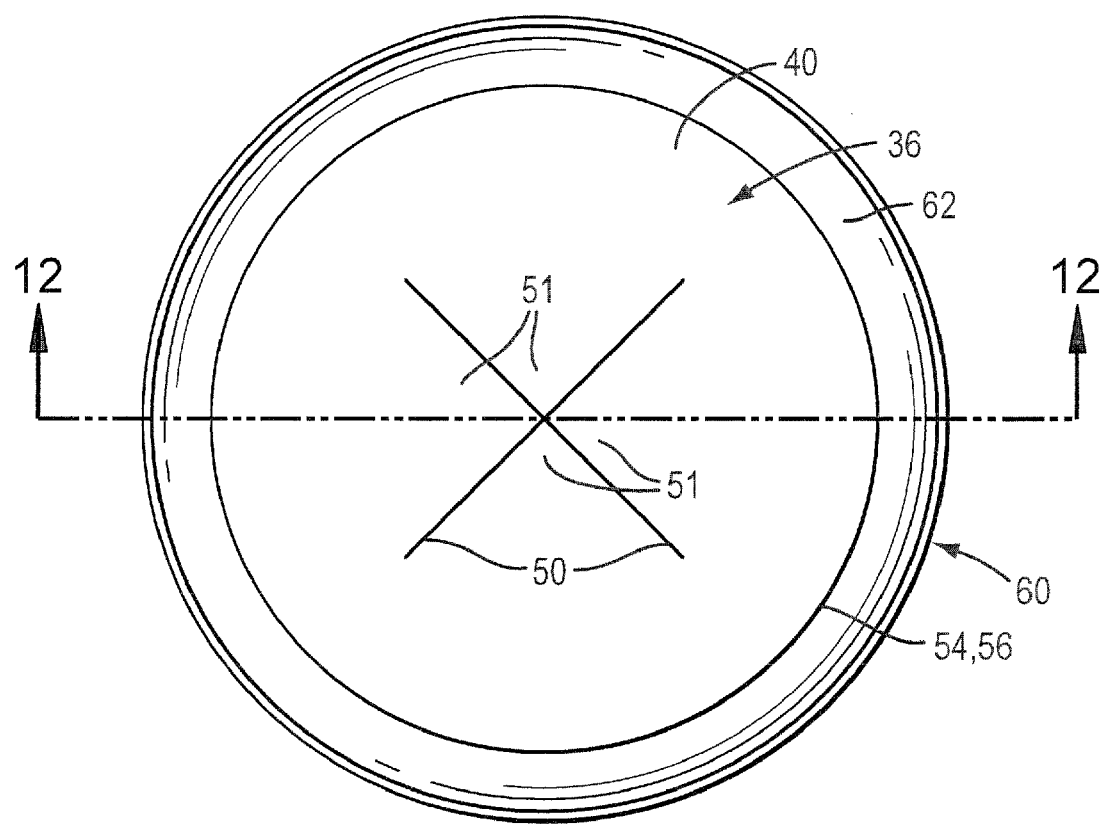
FIG. 11 is a plan view of the valve of FIG. 7, showing the valve in the closed state and unconstrained condition.

FIGS. 5 and 6 illustrate an example of the valve 24 opening in the first direction wherein a fluid inlet conduit or fill tool 52 has been inserted in the first direction in order to direct a beverage into the interior volume 32 via a flow path 53 in the conduit or fill tool 52. The open petals 51 accommodate the penetration of the end of the fill tool 52 into the interior volume 32 of the container 21. The petals 51 seal around the periphery of the fill tool 52 in a substantially liquid-tight manner. When the fill tool 52 is withdrawn from the valve head 36 by movement in the second direction, the inherent resiliency of the head 36 and petals 51 return the orifice to the closed condition.

Figure 4A:
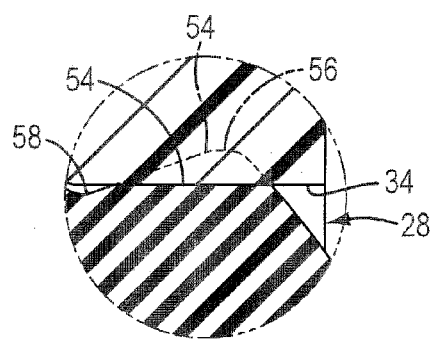
FIG. 4A is an enlarged view of the encircled portion of FIG. 4.

The valve head 36 may also be characterized as having a laterally outwardly facing peripheral surface 54 at the outer periphery of the valve head 36. The surface 54 is sized and/or shaped in its as-molded or unconstrained condition so that it is compressed laterally inwardly by engagement with the surface 34 of the port 28, as best seen in FIGS. 4 and 4A, with the phantom line in FIG. 4A showing the unconstrained size and shape of surface 54 of the illustrated embodiment in comparison to the surface 34. This laterally inward compression of the head 36 imposes a closing force on the self-sealing slits 50 that increases the resistance of the normally closed orifice to opening in at least the second direction (toward the exterior environment 30 in FIGS. 1-4) when the valve head 36 is subjected to an increased pressure differential acting across the head 36 such as is caused by hydraulic hammer. It should be noted that this is particularly advantageous in connection with a system 20 wherein the valve head 36 is penetrated by a fill tool 52 and must return to the closed condition and resist hydraulic hammer after the fill tool 52 is removed.

As best seen in FIG. 12, in the preferred, illustrated form, the surface 54 is frusto-conical with a maximum diameter 56 adjacent the side 40 and a minimum diameter 58 adjacent a peripheral attachment portion or flange 60 of the valve 24. The maximum diameter 56 is greater than the diameter D of the surface 34. The minimum diameter 58 is preferably equal to the diameter D of the surface 34, or just slightly less than the diameter D. While it is believed that the illustrated frusto-conical shape provides a superior closing force, other shapes and/or sizes for the surface 54 that create an interference fit with the surface 34 may be desirable depending upon the particular requirements and parameters of each application.

To accommodate mounting and retention of the valve 24, the flange 60 preferably has a generally dovetail-shaped, transverse cross section which defines a pair of frusto-conical surfaces 62 and 64, as best seen in FIG. 12. As best seen in FIG. 5, the port structure 22 includes an annular seat 66 for matingly engaging the axially inwardly facing frusto-conical surface 62 of the flange 60. The mounting fitment or retainer 26 includes a retainer ring 68 which has an axially inwardly facing clamping surface 70 which is adapted to matingly engage, and clamp against, the axially outwardly facing frusto-conical surface 64 of the flange 60. A lateral peripheral edge 72 of the retainer ring 68 can be maintained in snap-fit engagement with an annular retaining bead 74 of the port structure 22 that is located axially outwardly from the annular seat 66. The snap-fit engagement of the retainer ring 68 within the port structure 22 causes the ring 68 to clamp the valve 24 tightly in the port structure 22. The fitment 26 preferably also includes a generally cylindrical wall 76 extending axially outwardly from the retainer ring 68 to assist in assembly and disassembly of the system 20.

During assembly, the retainer ring 68 can be pushed past the retaining bead 74 because there is sufficient flexibility in the retainer ring 68 and/or port structure 22 to accommodate temporary, elastic deformation of the components as the retainer ring 68 passes over, and inwardly beyond, the bead 74 to create a snap-fit engagement between the retainer ring 68 and port structure 22 such that the valve flange 60 is compressed at least slightly and clamped between the opposing frusto-conical surfaces 66 and 70 (FIG. 4). While a preferred form of mounting has been shown, the port structure 22 and valve 24 could have other configurations, such as a different shape for the mounting flange 60 and seat 66. Also, in some other arrangements, the valve 24 could be held in the port structure 22 without a retainer ring. For example, the valve 24 could be held in the port structure 22 by heat bonding, swaging of a portion of the port structure 22 over the valve flange 60, adhesive, and/or a press fit, etc.

The valve 24 is typically designed to close when the pressure differential across the valve head 36 drops below a predetermined amount. The inherent resiliency of the valve 24 allows the valve 24 to return to the normally closed condition (by action of the force generated from the resilient valve's deformational stresses). Preferably, the valve 24 is sufficiently stiff in its unconstrained condition so that it would remain closed under the weight or static head of the substance in the container bearing against the interior side 40 even without the closing force generated by engagement of the surfaces 34 and 54.

It is to be understood that the orifice of the valve 24 may be defined by structures other than the illustrated straight slits 50. The slits may have various different shapes, sizes and/or configurations in accordance with the requirements and parameters of each particular application. For example, the orifice may also include four or more intersecting slits.

If it is desired to provide particular performance characteristics, then the system 20 is preferably configured for use in conjunction with (1) the characteristics or shape of the particular container, which may establish the maximum height (i.e., static head) of the substance or product in the container as well as the maximum anticipated hydraulic hammer, (2) the characteristics of the particular substance or product to be held within the container, and (3) any relevant characteristics of the other components, such as the fill tool 52. For example, the viscosity and density of the fluent substance product can be relevant factors in designing the specific configuration of the system 20 and valve 24. The rigidity and durometer of the valve material, and size and shape of the valve head 36, can also be relevant to achieving some desired characteristics, and can be selected for accommodating the normal range of pressure differential that is expected to be typically applied across the valve head 36, and for accommodating the characteristics of the substance to be held in the container.

It will be readily observed from the foregoing detailed description of the invention and from the illustrations thereof that numerous other variations and modifications may be effected without departing from the true spirit and scope of the novel concepts or principles of this invention.

The invention claimed is:

1. A port closure system with hydraulic hammer resistance, said system comprising:
  a port to establish communication between an interior volume that can receive a fluent substance and an exterior environment, the port having a laterally inwardly facing engaging surface; and
  a valve including a flexible, resilient head extending across the port, the head having:
    an interior side facing the interior volume;
    an exterior side facing the exterior environment;
    at least one self-sealing slit through the head;
    confronting, openable portions along the slit to define a normally closed orifice in an unconstrained condition wherein the openable portions can move in a first direction toward the interior volume to an open orifice configuration and in a second direction toward the exterior environment to an open orifice configuration; and
    a laterally outwardly facing peripheral surface compressed laterally inwardly by engagement with the engaging surface to thereby impose a closing force on said self-sealing slit to increase the resistance of the normally closed orifice to opening in at least the second direction when the valve head is subjected to a pressure differential acting across the valve head.

2. The port closure system of claim 1 wherein the interior side is defined by a convex surface.

3. The system of claim 2 wherein the convex surface is arcuate.

4. The system of claim 1 wherein the exterior side is defined by a concave surface.

5. The system of claim 4 wherein the concave surface is arcuate.

6. The system of claim 4 wherein the concave surface is semispherical.

7. The system of claim 1 wherein the at least one self-sealing slit comprises two self-sealing slits extending transverse to each other.

8. The system of 7 wherein one of the two slits is more than 50% longer than the other of the two slits.

9. A port closure system with hydraulic hammer resistance, said system comprising:
  a port to establish communication between an interior volume that can receive a fluent substance and an exterior environment, the port having a laterally inwardly facing engaging surface; and
  a valve including a flexible, resilient head extending across the port, the head having:
    an interior side facing the interior volume;
    an exterior side facing the exterior environment;
    at least one self-sealing slit through the head;
    confronting, openable portions along the slit to define a normally closed orifice in an unconstrained condition wherein the openable portions can move in a first direction toward the interior volume to an open orifice configuration and in a second direction toward the exterior environment to an open orifice configuration;
    a laterally outwardly facing peripheral surface compressed laterally inwardly by engagement with the engaging surface to thereby impose a closing force on said self-sealing slit to increase the resistance of the normally closed orifice to opening in at least the second direction when the valve head is subjected to a pressure differential acting across the valve head; and wherein the engaging surface is a cylindrical surface with a diameter D and the laterally outwardly facing peripheral surface is a frusto-conical surface in the unconstrained condition.

10. The system of claim 9 wherein the frusto-conical surface has a maximum diameter adjacent the interior side that in the unconstrained condition is greater than the diameter D.

11. The system of claim 10 wherein the valve further comprises a peripheral attachment portion and the frusto-conical surface converges from the maximum diameter to a minimum diameter adjacent the peripheral attachment portion.

12. The system of claim 1 wherein the valve is initially separate from, but subsequently engaged with the engaging surface.

13. The system of claim 12 further comprising a seat around the port and wherein the valve further comprises a peripheral attachment portion engaged in said seat.

14. The system of claim 13 wherein said seat is located outside of the interior volume.

15. The system of claim 13 further comprising a retainer ring in snap-fit engagement with said seat to clamp the peripheral attachment portion between the retainer ring and the seat.

16. The system of claim 13 wherein the laterally outwardly facing peripheral surface extends from the interior side to the peripheral attachment portion.

17. A port closure system with hydraulic hammer resistance, said system comprising:
   a port structure including a port for establishing communication between (1) an interior volume that can receive a fluent substance, and (2) an exterior environment, said port including an laterally inwardly facing engaging surface; and
   a valve that is disposed across said port and that has:
   (1) a peripheral attachment portion; and
   (2) a flexible, resilient head that extends from said peripheral attachment portion, and that has (a) an interior side, (b) an exterior side interfacing with said exterior environment, (c) at least one self-sealing slit through said head, (d) a laterally peripheral surface, (e) confronting, openable portions along said slit to define an initially closed orifice wherein said valve head openable portions can move generally in a first direction toward said interior volume to an open configuration and wherein said valve head openable portions can also move generally in a second direction toward said exterior environment to an open configuration, (f) an initial, manufactured configuration in which said valve orifice is closed; and
   wherein said valve head is disposed in said port structure to locate said laterally peripheral surface of said valve head in engagement with, and compressed laterally inwardly by, said engaging surface of said port structure to thereby impose stress on said valve head to increase the resistance of said valve orifice to opening at least in said second direction when said valve head is subjected to a pressure differential acting across said valve head.

18. The system in accordance with claim 17 in which
   said valve is initially separate from, but subsequently attachable to, said port structure across said port; and
   said port structure defines a seat around said port for receiving said valve peripheral attachment portion in a seated engagement.

19. The system in accordance with claim 18, wherein said system further includes a retainer ring in snap-fit engagement with said port structure to clamp said valve between said retainer ring and said seat.

* * * * *